United States Patent Office 3,737,337
Patented June 5, 1973

3,737,337
PROCESS FOR THE PRODUCTION OF MICROGRANULATES
Hildegard Schnoring, Wuppertal-Elberfeld, Gottfried Pampus and Nikolaus Schon, Leverkusen, and Josef Witte, Cologne-Stammheim, Germany, assignors to Farbenfabriken Bayer Aktiengesellschaft, Leverkusen, Germany
No Drawing. Filed Feb. 9, 1971, Ser. No. 114,044
Claims priority, application Germany, Mar. 4, 1970,
P 20 10 115.9
Int. Cl. B44d 1/02; B01j 13/02
U.S. Cl. 117—100                                    14 Claims

ABSTRACT OF THE DISCLOSURE

A process for the production of solid, free-flowing spherical microgranulates from a polymer matrix containing solid or liquid particles of a core material embedded therein, wherein
(1) a solution of the shell-forming polymer is prepared in a solvent soluble to at most 15% by weight in water at 20° C.,
(2) a solid or liquid core material is dissolved or dispersed in this solution,
(3) the resulting solution or dispersion ("organic phase A") is suspended in an aqueous liquid (aqueous phase B) that is immiscible with the organic solvent,
(4) the organic solvent is allowed to migrate slowly and under control out of the organic phase A so that the dissolved polymer is deposited onto the surface of the particles dispersed in aqueous phase B, and
(5) the solidified particles, i.e. the microgranulate, are separated off.

---

Encapsulating processes for enveloping hydrophobic or hydrophilic substances in hydrophobic or hydrophilic shells have acquired considerable interest over recent years because, for a number of applications, the encapsulated substances must be controllably liberated.

Hydrophobic substances can, for example, readily be coated with gelatine coacervates in aqueous media. Interfacial reactions can be used for encapsulation in hydrophobic polymer shells, in which case the core material to be coated is mixed with a component A and then dispersed in a component B or a solution thereof. A condensation or addition reaction, for example, which results in the formation of insoluble shells takes place at the interface. The disadvantage of this process lies in the contamination of the core material by component A (Derwent 17,008/67, Japanese publication).

Hydrophilic substances can be encapsulated in hydrophobic shells by dispersing them, or solutions thereof, in a solution of a capsule-forming polymer and adding a second solvent which reduces the solubility of the polymer to such an extent that a polymer-rich phase (coacervate) is formed. This coacervate envelops the dispersed particles or drops so that, following isolation and drying, capsules with hydrophobic shells are obtained. Pairs of solvents such as these, combined with different polymers, are described in British patent specification No. 931,148. Unfortunately, working with solvent mixtures of this kind is far from rational and involves high processing costs. It is also known that the substances to be encapsulated can be dispersed in a solution of a shell-forming polymer, and the resulting dispersion can be then dispersed in a second liquid. The first liquid (solvent for the polymer) should be miscible with the second liquid, although the polymer should not dissolve in the second liquid, so that when the polymer solution containing the core material in dispersion is itself dispersed in the second liquid, the polymer is precipitated and deposited onto the surface of the particles to be encapsulated (Dutch Offenlegungschrift 6811852). In practice, the two solvents mix so quickly that the polymer is precipitated and is no longer available for encapsulating the dispersed particles. According to the examples of Dutch Offenlegungschrift 6811852 this can be prevented to some extent by dissolving in the second liquid a substance, for example itself a polymer, which can enter into an interfacial reaction with the shell-forming polymer in the first liquid. In this way, the two solvents mix more slowly and useful capsule formation is possible. In this process, solvent mixtures contaminated by the shell-forming polymers are formed as secondary products and are difficult to work up.

The present invention relates to a process for the production of solid, free-flowing spherical microgranulates from a polymer matrix having solid or liquid particles of a core material embedded in it.

The process according to the invention is distinguished by the fact that, (1) A solution of the shell-forming polymer is prepared in a solvent which is soluble to at most 15% by weight in water at 20° C.,
(2) A solid or liquid core material is dissolved or dispersed in this solution,
(3) The resulting solution of dispersion ("the organic phase A") is dispersed in an aqueous liquid (aqueous phase B) that is immiscible with the organic solvent,
(4) The organic solvent is allowed to migrate slowly and under control out of the organic phase A into the aqueous phase B, so that the dissolved polymer is deposited on the surface of the particles dispersed in the aqueous phase B, and
(5) The solidified particles, i.e. the mixed granulate, are separated off and optionally dried.

The gradual transfer of the organic solvent from the suspended organic phase A into the aqueous phase B is ensured by the choice of the organic solvent and of the aqueous phase A.

The organic solvent should be soluble to at most 15% by weight in water at 20° C.

The aqueous phase B should initially not absorb the organic solvent, which is achieved by saturating water with the organic solvent or by dissolving salts therein and using the resulting solutions as the aqueous phase B. During the process, i.e. after the organic phase A has been dispersed in the organic phase B, the organic solvent can be transferred from the dispersed particles of the organic phase A into the aqueous phase by slowly adding pure water or a solution promoter for the organic solvent in water, accompanied by mixing.

When the transfer of the solvent into the aqueous phase B has progressed to such an extent that stable shells have been formed around the particles, the particles can be separated off, washed and dried so that any water and solvent residues adhering are evaporated off. The drying temperatures must be adjusted to suit the enveloped material (e.g. its boiling point or melting point).

It was surprising that spherical microgranulates with a solid shell should be formed during the gradual, controlled transfer of the solvent from the organic phase (A) into the aqueous phase (B) because, if the transfer is allowed to take place quickly, i.e. if the organic phase (A) is dispersed in pure water, the solvent is soon transferred into the water. If this happens, the polymer, instead of being obtained in the form of spherical particles, is precipitated in the form of filaments, strands or thin layers, liberating some of the core material. The same occurs to a greater extent when the solubility of the organic solvent in water is in excess of 15% by weight. In this event, it is no longer possible to obtain a controlled transfer, even following the addition of salts.

Examples of solvents suitable for use in the process according to the invention include aliphatic alcohols and ketones preferably those containing at least 4 carbon atoms such as 1-butanol, 2-butanol, 2-methyl-1-propanol, 2-methyl-2-butanol, butanone, diethyl ketone, methyl n-propyl ketone, and methyl isopropyl ketone, i.e. solvents having limited solubility in water.

The following are examples of polymers which may be used for shell formation or for matrix formation from alcohols or ketones: ethyl cellulose containing 2.0 to 2.6 ethoxyl groups per anhydroglucose unit and ethyl hydroxyethyl cellulose having a viscosity of from 3 to 200 cp. (measured as a 5% by weight solution in a mixture of 80% by weight of toluene and 20% by weight of ethanol); poly(meth)acrylic esters, polyvinyl acetate and acetyl cellulose are also suitable for shell formation from solutions of the ketones used according to the invention.

Examples of solution promoters which accelerate transfer of the solvent into the aqueous phase include easily water-soluble lower alcohols and ketones preferably containing up to 4 carbon atoms such as methanol, ethanol, propanol or acetone.

Examples of suitable neutral salts include alkali metal salts of strong inorganic acids such as NaCl, $Na_2SO_4$, $K_2SO_4$, and KCl.

Solid or liquid, hydrophobic or hydrophilic, inorganic or organic, substances may be used as the substances to be embedded or encapsulated in the process according to the invention. Of the many possibilities, the following groups of substances are to be specifically mentioned: plant protection agents, pharmaceutical preparations, foodstuffs and food additives (for example spices or aroma substances), dyes (for example inorganic or organic pigments, or dye solutions), chemicals, lubricants and greases (for example oils), adhesives, and bonding agents etc. It is also possible to encapsulate mixtures of these substances, for example water-insoluble active ingredients and emulsifiers.

The substances to be encapsulated or embedded are dissolved or dispersed in the organic solution of the polymer (phase A), using the conventional mixers including (in the preparation of dispersions) vibrators, and high-speed stirrers etc.

The concentration of shell-forming polymers in phase (A) can preferably be from 2 to 20% by weight, and the quantity of substance to be encapsulated, that is to say the core substance, preferably from 2 to 50% by weight, based on the polymer solution. In general, the quantities selected will be governed by the required quantitative ratio between the shell material and the enveloped core material, the quantity of matrix normally used being from 10 to 70% by weight, based on the microgranulates.

In addition to hydrophobic core substances, it is also possible to disperse or dissolve hydrophilic and, in some instances, even water-soluble substances in the polymer solution. In this instance, however, transfer of the solvent into the aqueous phase, and hence shell formation, have to be carried out more quickly.

The dispersion of phase (A), containing the core material in solution or in suspension, is carried out in the aqueous phase (B) again using conventional mixers, such as high-speed mixers, vibration mixers or even spray nozzles, in which case the particle size of the microgranulates according to the invention will be determined not only by the concentration of phase (A) but also by the particle sizes obtained.

In order to make phase (A) easier to disperse in phase (B) it is possible to use small quantities e.g. 0.1 to 5% by weight of high molecular weight suspending aids in phase (B), for example cellulose derivatives (e.g. carboxymethyl cellulose or hydroxyethyl cellulose etc.), alginates, polyethylene oxide and modified maleic anhydride copolymers etc., and also the usual emulsifiers.

The speed at which the solvent is transferred from phase (A) into the aqueous phase determines the quality of the surface of the microgranulates. If the solvent is transferred over a period of from 3 to 15 minutes, in other words if the water or solution promoter is added within this period, microgranulates with a rough porous shell are obtained. If the solvent is allowed to issue more slowly, e.g. over a period of from 15 to 60 minutes, smooth non-porous shells are obtained. In principle, therefore, shell formation can be carried out over periods ranging, for example, from 3 minutes to 10 hours. It is important not to fall below this lower limit. The upper limit is by no means critical, and is determined solely by economic considerations.

The quantity of water which can be added in order to remove the organic solvent generally amounts to from 50 to 500% by weight, based on the dispersion of phase (A) and phase (B). In many instances, it can be larger or smaller. The solution promoter is generally used in quantities of from 10 to 100% by weight, based on the dispersion of phase (A) in phase (B).

The transfer of the solvent to phase (B) in the manner described above is also accompanied by mixing of the dispersion. In general, shell formation occurs after only 20 to 30% by weight of the organic solvent have been transferred into the aqueous phase so that the microgranulates can be separated off and dried. In large-scale operations the drying process may be carried out by the fluidised-bed-technique wherein the particles are kept moving in a gas stream. It is also possible to transfer higher quantities of the organic solvent into the aqueous phase. Unfortunately, this does not as a rule afford any advantages, especially since a large part of the solvent can be recovered pure from the microgranulates during drying.

Drying can be carried out either in vacuo or at normal pressure, generally at temperatures of from 50 to 150° C. The dried microgranulates contain the core substances in the form of small droplets or particles either embedded in, or even partly dissolved in, the polymer matrix. The size of the microgranulates and of the embedded particles or droplets can be varied within wide limits.

The microgranulates produced in accordance with the invention have considerable significance for the delayed release of substances (for example pharmaceuticals) and for the release of substances under special conditions, for example pressure, temperature, or solvent addition.

EXAMPLE 1

5 parts by weight of ethyl cellulose (ethoxyl group content 47%, viscosity of a 5% by weight solution in toluene containing 20% by-weight of ethanol=10 cp.) were dissolved in 96 parts by weight of n-butanol, 8 parts by weight of paraffin oil were emulsified into this solution using a high speed stirrer. This emulsion was dispersed in 500 parts by weight of water saturated with n-butanol at 15° C., using a blade stirrer, so that droplets from 200 to 500µ size were dispersed in the aqueous phase.

1000 parts by weight of pure water were added over a period of 30 minutes with continued stirring. The droplets gradually became enveloped in a solid shell. After 40 minutes, the spherical particles were sifted off and dried in an air stream at 30° C. 13 parts by weight of a free-flowing microgranulate with a particle diameter of from 100 to 300µ were obtained. The particles had an impervious shell, containing droplets of paraffin oil separated by walls of ethyl celulose, as shown by photographs taken from an electron microscope.

EXAMPLE 2

12 parts by weight of ethyl cellulose (ethoxyl group content 46%, viscosity of a 5% by weight solution in toluene containing 20% by weight of ethanol=50 cp.) were dissolved in 180 parts by weight of n-butanol-2. 18 parts by weight of the phosphous compound

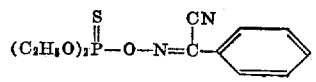

were dissolved in the solution.

The resulting solution was dispersed in 900 parts by weight of water saturated with 2-butanol at 15° C. using an intensive stirrer so that 200–400µ-diameter drops of the solution were distributed in the aqueous continuous phase, 1200 parts by weight of the water were added over a period of 25 minutes at 15 minutes at 15° C., as a result of which the droplets became enveloped in a solid shell. The microcapsules were separated off and dried in an air stream a 40° C.

The free-flowing microgranulate had a particle diameter of from 80 to 300µ. 30 parts by weight of microgranulate were obtained. The capsules contained droplets of the phosphorus compound embedded in the polymer matrix.

EXAMPLE 3

5 parts by weight of ethyl cellulose (ethoxyl group content 47%, viscosity of a 5% by weight solution in toluene containing 20% by weight of ethanol=10 cp.) were dissolved in 80 parts by weight of 2-methyl-1-propanol 10 parts by weight of the phosphorus compound

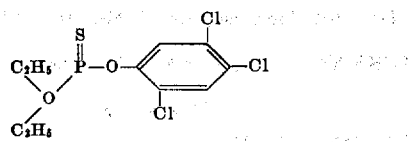

were dissolved in this solution. The resulting solution was dispersed in 300 parts by weight of water saturated with sodium chloride at a temperature of 20° C. 1000 parts by weight of water were added with stirring over a period of 25 minutes, as a result of which the droplets became enveloped in a solid shell. Separation was followed by drying in an air stream at 40° C. 15 parts by weight of a microgranulate with an average particle size of 200µ and a solid shell were obtained.

EXAMPLE 4

7 parts by weight of ethyl hydroxyethyl cellulose (viscosity of a 5% by weight solution in toluene containing 20% by weight of ethanol=55 cp.) were dissolved in 90 parts by weight of butanone. 12 parts by weight of titanium dioxide (particle size 50 to 100µ) were dispersed in this solution. The dispersion was dispersed in 200 parts by weight of water saturated with butanone. The formation of shells around the droplets was brought about by the addition of 300 parts by weight of water over a period of 20 minutes. The particles separated off were dried in vacuo at 60° C. 19 parts by weight of a microgranulate having a particle diameter of from 300 to 500µ were obtained. Inside the particles, the $TiO_2$ particles are surrounded by polymer walls.

EXAMPLE 5

7 parts by weight of ethyl cellulose (as in Example 2) were dissolved in 110 parts by weight of n-butanol-1. 10 parts by weight of orange oil were dispersed in this solution at 10° C. The resulting dispersion was itself dispersed in 200 parts by weight of water, saturated with sodium chloride, at a temperature of from 5 to 10° C. Transfer of the n-butanol into the aqueous phase, and hence shell formation, was effected by the addition of 300 parts by weight of water over a period of 25 minutes. The particles were separated off and dried in an air streams at 35° C. The yield of microgranulate, having particle diameters in the range from 150 to 350µ, was 17 parts by weight. Inside the capsules, individual droplets of orange oil were embedded in the polymer matrix.

EXAMPLE 6

The encapsulation process of Example 1 was repeated, with the difference that 3-pentanone and, in a parallel experiment, 2-methyl-3-butanone were used as solvents instead of n-butanol. The paraffin oil was emulsified in the same way, but the two emulsions were stirred into saturated sodium chloride solution at 15° C. (particle size 200 to 500µ). By adding the same quantity of water, capsules were obtained which, when dried each gave 13 parts by weight of microgranulate having particle sizes of from 100 to 300µ and containing paraffin oil droplets. It was not possible to detect any differences between the granulates obtained using two solvents.

COMPARISON TEST 1

The procedure was as described in Example 1, except that the paraffin oil emulsion was stirred into water which did not contain any butanol. The emulsion could not be dispersed in the form of droplets in water because the polymer was precipitated in the form of flakes and strands.

COMPARISON TEST 2

The procedure was as described in Example 5, except that n-propanol was used as solvent instead of n-butanol. No droplets were formed when the orange oil emulsion was dispersed in the sodium chloride solution, but instead the polymer was precipitated in the form of lumps and filaments. It was impossible to obtain microgranulates, even with improved stirring.

EXAMPLE 7

5 parts by weight of ethyl cellulose (cf. Example 1) were dissolved in 110 parts by weight of butanone and 5 parts by weight of acetyl salicylic acid were dissolved in the resulting solution. This solution was dispersed in 200 parts by weight of water, saturated with butanone, at 5 to 10° C. using a high speed stirrer. Capsule formation was promoted by the addition of 500 parts by weight of water over a period of from 25 to 30 minutes. After drying in an air stream at 40° C., 10 parts by weight of microgranulate having a particle size of from 300 to 500µ were obtained, having in their interior fine crystals of acetyl salicylic acid embedded in the polymer matrix. The shell was smooth and non-porous.

By adding the water required to transfer the butanone into the aqueous phase over a period of 10 minutes, the microgranulates with a rough porous surface were obtained.

What is claimed is:

1. A process for the production of solid, free-flowing spherical microgranulates comprising a solid polymer matrix shell having solid or liquid particles of a core material embedded therein, which process comprises
   (1) preparing a solution of the polymer in an organic solvent having a solubility of at most 15% by weight in water at 20° C.,
   (2) dissolving or dispersing a solid or liquid core material in this solution to form organic phase A,
   (3) suspending organic phase A in an aqueous liquid phase B that is immiscible with the organic solvent,
   (4) causing the organic solvent to migrate slowly and under control out of the organic phase A over a time period of at least three minutes by adding pure water to the dispersion, so that the dissolved polymer is deposited to form the surface of a microgranulate dispersed in aqueous liquid phase B, and
   (5) separating the resulting microgranulates.

2. The process as claimed in claim 1 wherein aqueous liquid phase B is solvent-saturated water, or water containing a salt dissolved in it, and the organic phase A is dispersed in aqueous liquid phase B.

3. The process as claimed in claim 1 wherein the organic solvent is an aliphatic alcohol or ketone having 4 or more carbon atoms.

4. The process as claimed in claim 1 wherein the organic solvent is 1-butanol, 2-butanol, 2-methyl-1-propanol, 2-methyl-2-butanol, butanone, diethyl ketone, methyl n-propyl ketone or methyl isopropyl ketone.

5. The process as claimed in claim 2 wherein the solution promoter is a water-soluble alcohol or ketone having up to 3 carbon atoms.

6. The process as claimed in claim 5 wherein the alcohol or ketone is methanol, ethanol, propanol or acetone.

7. The process as claimed in claim 2 wherein the salt dissolved in aqueous liquid phase B is an alkali metal salt of a strong inorganic acid.

8. The process as claimed in claim 1 wherein the polymer is ethyl cellulose having 2.0 to 2.6 ethoxyl groups per anhydroglucose unit, ethyl hydroxyethyl cellulose having a viscosity of from 3 to 200 cp. measured as a 5% by weight solution in a mixture of 80% by weight of toluene and 20% by weight of ethanol, and the solvent is an alcohol or ketone.

9. The process as claimed in claim 1 wherein the polymer is a polyacrylic and/or polymethacrylic ester, polyvinyl acetate or acetyl cellulose.

10. The process as claimed in claim 1 wherein the concentration of polymer in organic phase A is from 2 to 20% by weight.

11. The process as claimed in claim 1 wherein the quantity of core material is from 2 to 50% by weight, based on polymer solution.

12. The process as claimed in claim 1 wherein aqueous liquid phase B contains a cellulose derivative, an alginate, polyethylene oxide, a modified maleic anhydride copolymer or a conventional emulsifier.

13. The process as claimed in claim 2 wherein the quantity of water added to cause the solvent to issue from organic phase A is from 50 to 500% by weight, based on the dispersion.

14. The process as claimed in claim 2 wherein the quantity of solution promoter is from 10 to 100% by weight, based on dispersion.

References Cited

UNITED STATES PATENTS

| | | | |
|---|---|---|---|
| 3,415,758 | 12/1968 | Powell | 117—100 X |
| 3,558,507 | 1/1971 | Harbort | 117—100 X |
| 3,531,418 | 9/1970 | Fanger et al. | 117—100 X |

FOREIGN PATENTS

| | | | |
|---|---|---|---|
| 929,470 | 6/1963 | Great Britain | 117—100 |
| 931,148 | 7/1963 | Great Britain | 117—100 X |
| 1,090,971 | 11/1967 | Great Britain | 252—316 |
| 6811852 | 2/1969 | Netherlands | 117—100 X |

OTHER REFERENCES

Derwent, Japanese, vol. 6, No. 36, 17,008/67.

MURRAY KATZ, Primary Examiner

U.S. Cl. X.R.

117—166; 252—316